Patented Jan. 19, 1932

1,841,801

UNITED STATES PATENT OFFICE

EUGÈNE GAY, OF LYON, FRANCE

PROCESS FOR OBTAINING PHOTOGRAPHIC IMAGES

No Drawing. Application filed October 14, 1926, Serial No. 141,670, and in France October 20, 1925.

This invention relates to a process for obtaining photographic images of the kind involving the production of azo dyes by reaction of diazo bodies sensitive to the action of light upon phenols, naphthols or amines in the presence of alkali.

I have found that diazo bodies obtained with anisidines are bodies remarkably sensitive to light. The derivatives of naphtanisidines have also the same properties; the dyes derived from them are of a deeper shade.

The terms "anisidines" and "naphtanisidines" are used in their broad signification and comprise all the alkyl ethers of orthoamidophenol and orthoamidonaphthols, or their nuclear substitution products.

The types of these diazo bodies endowed with a pronounced sensitiveness to light are the derivatives of paracresidine, amidohydroquinonedimethyl ether and 2-amido-1-4-dimethoxynaphtalene which are anisidines or naphthanisidines. The halogen, carboxyl, nitrated or sulphonated derivatives of these amines may also be employed.

The salts and their diazo derivatives constitute bodies in general very soluble in water, more or less coloured yellow, very stable with reference to heat.

The diazo derivatives of the anisidines and the naphthanisidines possess, like all other diazo bodies, the property of combining with the phenols and amines in the presence of alkali to give the azo colours. The action of light upon them is to decompose and transform them into products which react no longer with the phenols and the amines. Thus, if a sheet of paper or any other suitable support, impregnated with a solution of these diazo bodies, is exposed to light under a drawing, the parts of the diazo bodies which are disposed under the lines of the drawing and which are not for that reason subjected to the action of the light remain unaltered and capable of giving rise, on reaction with a phenol or an amine, to an azo colour, while the parts not protected are decomposed by the action of light and give rise to no such colouration on the treatment of the phenol or amine. The effect of the light is to destroy the diazo bodies at the exposed parts. The diazo bodies used being in general of a yellow, more or less brownish shade, and their products of decomposition being colourless, the image generally appears immediately after exposure to light in yellow on a white base. The action of the developer (amine or phenol) brings out the image in a definite form by transforming the yellow image to a brown, red, violet or blue image according to the nature of the bodies employed.

In using, it is not necessary to prepare them in a state of purity. It suffices to dissolve the amine in a determined quantity of water to which an acid is added, and to add the theoretical quantity of a solution of sodium nitrate.

For example:

10 gr. of amidohydroquinonedimethyl ether are dissolved in a mixture of 8 gr. of sulphuric acid 66°, and a litre of water.
There is added a solution of 4.8 gr. of sodium nitrate in 10 cc. of water. Thus a bath is obtained of diazohydroquinonedimethyl ether of a deep yellow colour.

The compound amidohydroquinonedimethyl ether, may be obtained by the reduction of nitrohydroquinonedimethyl ether by means of tin and hydrochloric acid, according to the process of Muhlhauser described in Liebigs' Annals, vol. 207, page 254.

A sheet of paper or any other suitable substance is impregnated in this bath, dried and exposed to light under a design on transparent paper or the like, until the parts not protected by the design give a violet image by development in a bath of 20 gr. of amidonaphtholdisulphonic acid H.
20 gr. of sodium carbonate, and 1 litre of water.

I claim:

1. A process for obtaining a photographic image of the kind described, consisting in impregnating a substance having a surface adapted for the reception of a photographic image; with an aqueous solution of diazohydroquinonedimethyl ether, the substance being then dried and the surface then exposed to light under a transparent design having substantially opaque parts and then developing in an alkaline bath of amidonaphtholdisulphonic acid H for the production of a positive violet image.

2. A process for obtaining a photographic image of the kind described, consisting in impregnating a substance having a surface adapted for the reception of a photographic image with a diazo body sensitive to light, derived from an alkyl ether of orthoamidophenol and orthoamidonaphthols, exposing parts of the said surface to light and then treating the said surface with a developer comprising an azo coloration component in the presence of an alkali for the production of coloration at the parts of the said surface which are not exposed to the action of light.

EUGÈNE GAY.